(12) United States Patent
Inoue et al.

(10) Patent No.: US 9,329,788 B2
(45) Date of Patent: May 3, 2016

(54) COMPUTER SYSTEM AND METHOD FOR ALLOCATING AND RECOVERING VIRTUAL VOLUMES

(71) Applicant: Hitachi, Ltd., Tokyo (JP)

(72) Inventors: Tsuyoshi Inoue, Tokyo (JP); Katsumi Hirezaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 14/364,264

(22) PCT Filed: Jul. 2, 2013

(86) PCT No.: PCT/JP2013/068170
§ 371 (c)(1),
(2) Date: Jun. 10, 2014

(87) PCT Pub. No.: WO2015/001620
PCT Pub. Date: Jan. 8, 2015

(65) Prior Publication Data
US 2015/0324139 A1    Nov. 12, 2015

(51) Int. Cl.
*G06F 12/00* (2006.01)
*G06F 3/06* (2006.01)
*G06F 12/02* (2006.01)

(52) U.S. Cl.
CPC ............... *G06F 3/0619* (2013.01); *G06F 3/06* (2013.01); *G06F 3/0647* (2013.01); *G06F 3/0673* (2013.01); *G06F 12/023* (2013.01); *G06F 2212/152* (2013.01)

(58) Field of Classification Search
CPC .............. G06F 12/023; G06F 12/0284; G06F 2009/45583; G06F 2212/152; G06F 9/45558
USPC .................................................. 711/114, 171
See application file for complete search history.

(56) References Cited

U.S. PATENT DOCUMENTS

| 2009/0037685 | A1* | 2/2009 | Hansen ............... G06F 9/45558 711/171 |
| 2009/0125694 | A1 | 5/2009 | Innan et al. |
| 2009/0198946 | A1 | 8/2009 | Ebata |
| 2011/0167215 | A1* | 7/2011 | Eguchi ............... G06F 11/1076 711/114 |
| 2011/0191536 | A1 | 8/2011 | Mizuno et al. |
| 2012/0173814 | A1 | 7/2012 | Kawaguchi et al. |

FOREIGN PATENT DOCUMENTS

| JP | 62131350 A * | 6/1987 |
| JP | 20009-116809 A | 5/2009 |

(Continued)

*Primary Examiner* — Mardochee Chery
(74) *Attorney, Agent, or Firm* — Volpe and Koenig, P.C.

(57) ABSTRACT

In a storage system, a real page is allocated from a pool to a write destination virtual page in a virtual volume. The real page includes multiple real regions. The storage system moves all valid data stored in two or more move-source real pages respectively allocated to two or more virtual pages, to move-destination real pages the number of which is less than the number of move-source real pages in units of real regions. Each piece of valid data can be used by any one of the access sources. The storage system writes the predetermined data to all move-source real regions in each of move-source real pages, so that each of the move-source real pages is set as a recovery target real page which is a real page storing only the predetermined data, and performs real capacity recovery for making each recovery target real page into an unallocated state.

10 Claims, 12 Drawing Sheets

(56) References Cited

FOREIGN PATENT DOCUMENTS

| JP | 2009-187142 A | 8/2009 |
| JP | 2012-531653 A | 12/2012 |
| JP | 2012-533099 A | 12/2012 |

* cited by examiner

Fig. 3
VVOL management table
1300

| VVOL# 1301 | Virtual page # 1302 | Allocation flag 1303 | POOL# 1304 | Real page # 1305 |
|---|---|---|---|---|
| 1 | 1 | Allocated | 1 | 1 |
| | 2 | Allocated | | 2 |
| | .... | .... | | .... |
| | n | Not allocated | | NULL |
| 2 | 1 | Not allocated | 2 | NULL |
| | 2 | Allocated | | 1 |
| | .... | .... | | .... |
| | n | Allocated | | n |
| ..... | ..... | ..... | ..... | ..... |

Fig. 4

Page management table
1400

| VVOL# 1401 | Virtual page # 1402 | Real page # 1403 | Real LBA # 1404 | Data 1405 | Flag 1406 |
|---|---|---|---|---|---|
| 1 | 1 | 1 | 1 | aa | 1 |
| | | | 2 | 00 | |
| | | | ..... | ..... | |
| | | | N | 00 | |
| | 2 | 3 | 1 | bb | 0 |
| | | | 2 | b | |
| | | | ..... | ..... | |
| | | | N | cc | |
| | ..... | | ..... | ..... | ..... |
| | n | 55 | 1 | 00 | 1 |
| | | | 2 | 00 | |
| | | | ..... | ..... | |
| | | | N | 00 | |

Fig. 5
Association management table
1500

| Virtual page # (1501) | Virtual LBA # (1502) | Move source (1503) | | Move destination (1504) | |
|---|---|---|---|---|---|
| | | Real page # (1505) | Real LBA # (1506) | Real page # (1507) | Real LBA # (1508) |
| 1 | 1 | 1 | 2 | 5 | 1 |
| 1 | 2 | 1 | 3 | 5 | 2 |
| 1 | 3 | 1 | 5 | 5 | 3 |
| 9 | 1 | 4 | 5 | 5 | 4 |
| 19 | 1 | 4 | 3 | 7 | 1 |
| 21 | 1 | 6 | 4 | 7 | 2 |
| 21 | 1 | 8 | 5 | 9 | 1 |
| 24 | 1 | 18 | 6 | 9 | 2 |
| ...... | ...... | ...... | ...... | ...... | ...... |

COMPUTER SYSTEM AND METHOD FOR ALLOCATING AND RECOVERING VIRTUAL VOLUMES

TECHNICAL FIELD

The present invention relates to storage control, and, for example, relates to arrangement control of data stored in a virtual logical volume according to thin provisioning.

BACKGROUND ART

For example, PTL 1 discloses a storage system providing a virtual logical volume (hereinafter, VVOL) according to thin provisioning (also referred to as dynamic provisioning). This kind of storage system includes the VVOL and a pool constituted by multiple pool volumes (hereinafter, pool VOLs). This kind of storage system provides the VVOL to a host computer. The size of VVOL provided to the host computer may be equal to or more than the size of the pool.

The VVOL includes multiple virtual pages (virtual storage regions). The pool VOL includes two or more real pages (actual storage regions) which are cut out from one or more storage devices (for example, RAID (Redundant Array of Independent (or Inexpensive) Disks) group).

When there is a virtual page that is not allocated to a virtual page that belongs to write destination (for example, address) designated with a write command by the host computer (virtual page for which no real page is allocated from the pool), the storage system allocates a real page to the virtual page from the pool, and writes data according to the write command to the allocated real page.

PTL 1 also discloses a technique for writing predetermined data such as zero (hereinafter, zero data) to the entire region of the real page allocated to the virtual page storing invalid data (data that cannot be used) and recovering the real page storing only zero data (real capacity) as the allocatable real capacity to the pool (hereinafter, recovery of real capacity).

CITATION LIST

Patent Literature

[PTL 1]
Japanese Patent Application Laid-Open No. 2009-116809

SUMMARY OF INVENTION

Technical Problem

The real page is constituted by multiple data regions in which multiple data can be respectively stored, and in PTL 1, the recovery of the real capacity is done units of real pages. For this reason, when even a piece of valid data (data that can be used by the host computer) exists in a real page, zero data cannot be written to the entire real page, and it is impossible to recover the real capacity of the real page back to the pool.

By the way, a technique for allowing multiple virtual host computers (hereinafter, VMs) to use one storage system (for example, VDI (Virtual Desktop Infrastructure)) is known. In this technique, multiple VMs can use one VVOL. A write destination designated by a write command transmitted by a VM is generally a smaller unit than a virtual page (for example, a range designated by LBA (Logical Block Address)). For this reason, in a real page allocated to one virtual page, there may be multiple data which are written by multiple VMs in an mixed manner.

Now, suppose that several VMs are deleted. In this case, among the data in one real page, data written by a deleted VM can be treated as invalid data. However, this real page may store valid data used by other VMs, and in such case, all the data in the real page cannot be changed to zero data. Accordingly, the real capacity of the real page cannot be recovered to the pool as allocatable real capacity.

One of methods for solving this problem is a method including moving all the remaining VMs to another physical computer, and copying each of the valid data of the VMs from the real page storing the valid data (which will be referred to as "target real page" in this paragraph and next paragraph) to a real page in another pool. According to this method, it is possible to create a state in which the target real page is used by none of the VMs, and therefore, zero data can be written to the entire region of the target real page, and the real capacity of the target real page can be recovered.

However, according to this method, all the VMs using the target real page and the valid data of the VMs are required to be moved, and this makes the operation complicated, and for this reason, the overall performance of the storage system may be reduced.

This kind of problem may also occur in a case where one VVOL is used by multiple physical host computers on in a case where one VVOL is used by multiple application programs in one computer (virtual computer or physical computer).

Solution to Problem

A storage system includes a virtual volume, a pool, and a storage controller. The virtual volume is a virtual logical volume, is provided to multiple access sources and includes multiple virtual pages. The pool is a set of multiple real pages each including multiple real regions. Each real page includes multiple real regions. The storage controller receives a write command designating a write destination virtual address from each access source, and when a real page is not allocated to a write destination virtual page to which the write destination virtual address belongs, allocates an unallocated real page to the write destination virtual page. The storage controller writes write target data according to the write command to a real region to which a real address corresponding to the write destination virtual address belongs (real region in allocated real page). The storage controller receives a special write command which is a command for writing predetermined data and designates a write destination address, and then writes the predetermined data to a real region corresponding to the write destination address. The storage controller performs data move processing for moving all multiple valid data stored in two or more move-source real pages respectively allocated to two or more virtual pages, to move-destination real pages the number of which is less than the number of move-source real pages in units of real regions. Each piece of valid data is data that can be used by any one of the access sources. The storage controller writes the predetermined data to all move-source real regions in each of move-source real pages, so that each of the move-source real pages is set as a recovery target real page which is a real page storing only the predetermined data, and the storage controller performs the real capacity recovery for making each recovery target real page into an unallocated state.

It should be noted that the "access source" may be any type of entity accessing the VVOL. For example, it may be a physical computer, a virtual computer, or an application program executed by a physical computer or a virtual computer.

BRIEF DESCRIPTION OF DRAWINGS

FIG. 3 illustrates an example of VVOL management table 1300.

FIG. 4 illustrates an example virtual page management table 1400.

FIG. 5 illustrates an example of association management table 1500.

DESCRIPTION OF EMBODIMENTS

Hereinafter, an embodiment will be explained.

In the explanation below, an expression "xxx table" may refer to various kinds of information, but various kinds of information may expressed in a data structure other than the table. In order to indicate that it is not dependent upon any data structure, "xxx table" can also be referred to as "xxx information".

A management computer may be constituted by one or more computers. The management computer includes an I/O (Input/Output) device, a storage resource, and a processor coupled to these elements. The I/O device may be, for example, a display device, a microphone, a speaker, a keyboard, or a pointing device, but may be a device other than the above, for example, a communication interface device (for example, a serial interface or Ethernet (registered trademark) interface). The communication interface device may be coupled to a computer (hereinafter, a computer for display) having an I/O device (for example, a display device, or a keyboard and a pointing device). The action of "displaying" that is performed by the management computer (or a processor possessed by the management computer) may be any one of an action of the management computer displays information on a display device of the management computer and an action of transmitting information, which is to be displayed on the display device of the computer for display, to the computer for display.

In the explanation below, when the same type of elements are explained without being distinguished from each other, they are explained using the name of the element and the reference sign (for example, VVOL 324), and when the same type of elements are explained so as to be distinguished from each other, they are explained using a combination of the name of the element and an identification number allocated to the element (for example, VVOL-1).

Figure 1:
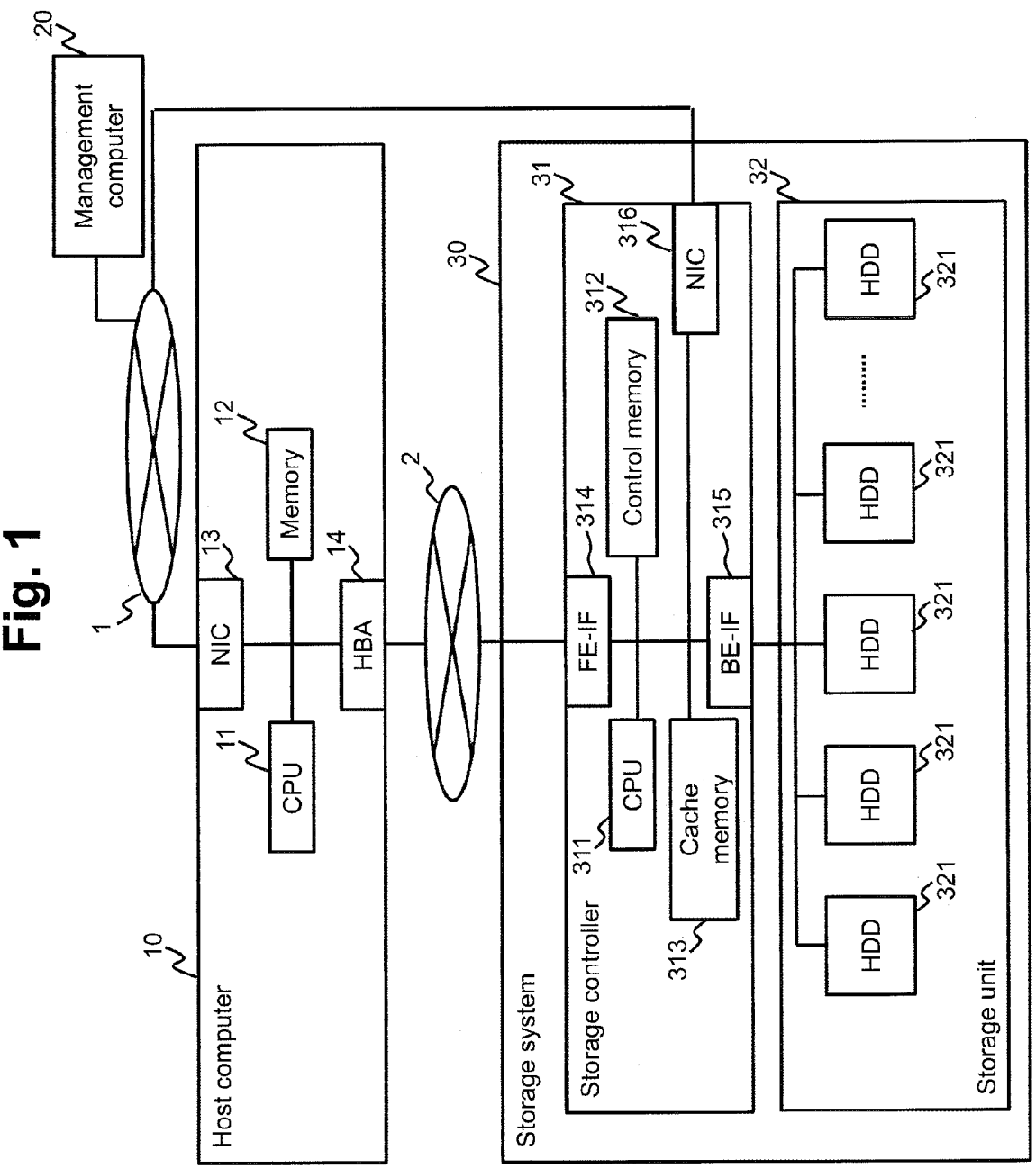
FIG. 1 illustrates an example of physical configuration of a computer system according to an embodiment.

FIG. 1 illustrates an example of physical configuration of the computer system according to the embodiment.

The computer system includes a host computer 10, a management computer 20, and a storage system 30. The management computer 20 and the storage system 30 are coupled to each other via a first communication network (for example, LAN (Local Area Network) 1) in such a manner that the management computer 20 and the storage system 30 can communicate. The host computer 10 and the storage system 30 are coupled to each other via a second communication network (for example, SAN (Storage Area Network) 2) in such a manner that the host computer 10 and the storage system 30 can communicate. It should be noted that the first and second communication networks may be integrally formed.

The host computer 10 includes a communication interface, a storage device, and a processor coupled thereto. The communication interface may be, for example, a NIC (Network Interface Card) 13, and an HBA (Host Bus Adapter) 14. The storage device may be, for example, a memory 12. The processor may be, for example, a CPU (Central Processing Unit) 11.

The memory 12 stores information and programs for managing the storage system 30. The CPU 11 executes programs stored in the memory 12 to achieve various kinds of functions. The NIC 13 is a communication interface device for coupling the host computer 10 and the management computer 20 to each other. The host computer 10 is coupled to the management computer 20 via a NIC 13 and a LAN 1. The HBA 14 is a communication interface device for coupling the host computer 10 and the storage controller 31 to each other. The host computer 10 is coupled to the storage controller 31 via the HBA 14 and the SAN 2.

The management computer 20 is, for example, a computer having a display device and an input device. For example, in accordance with operation performed by an administrator, the management computer 20 transmits a command for making various kinds of settings to the storage system 30.

The storage system 30 includes a storage controller 31 and a storage unit 32. The storage unit 32 includes multiple storage devices 321.

The storage controller 31 includes a communication interface, a storage device, and a processor coupled thereto. The communication interface is, for example, an FE-I/F (Front End Inter/Face) 314, a BE-I/F (Back End Inter/Face) 315, and a NIC 316. The storage device may be, for example, a control memory 312 and a cache memory 313. The processor may be, for example, a CPU 311.

The control memory 312 stores information and programs for controlling the storage unit 32. The CPU 311 executes programs stored in the memory 312 to achieve various kinds of functions. The cache memory 313 temporarily stores data that are written to the storage unit 32 and data that are read from the storage unit 32.

The FE-I/F 314 is an interface device for communicating with an external device existing at front end of the host computer 10 and the like. The BE-I/F 315 is an interface device with which the storage controller 31 communicates with the storage device in the storage unit 32. The NIC 316 is a communication interface device for coupling the host computer 10 and the management computer 20 to each other.

The storage unit 32 includes multiple HDDs (Hard Disk Drives) 321. Instead of the HDD 321, it may be possible to employ other types of storage devices (nonvolatile storage devices), for example, a FM (Flash Memory) device such as an SSD (Solid State Device). The storage unit 32 may include different types of storage devices. An RG (RAID group) may be constituted by multiple storage devices of the same type. The RG stores data according to predetermined RAID level. In the present embodiment, the RG is constituted by multiple HDDs 321.

Figure 2:
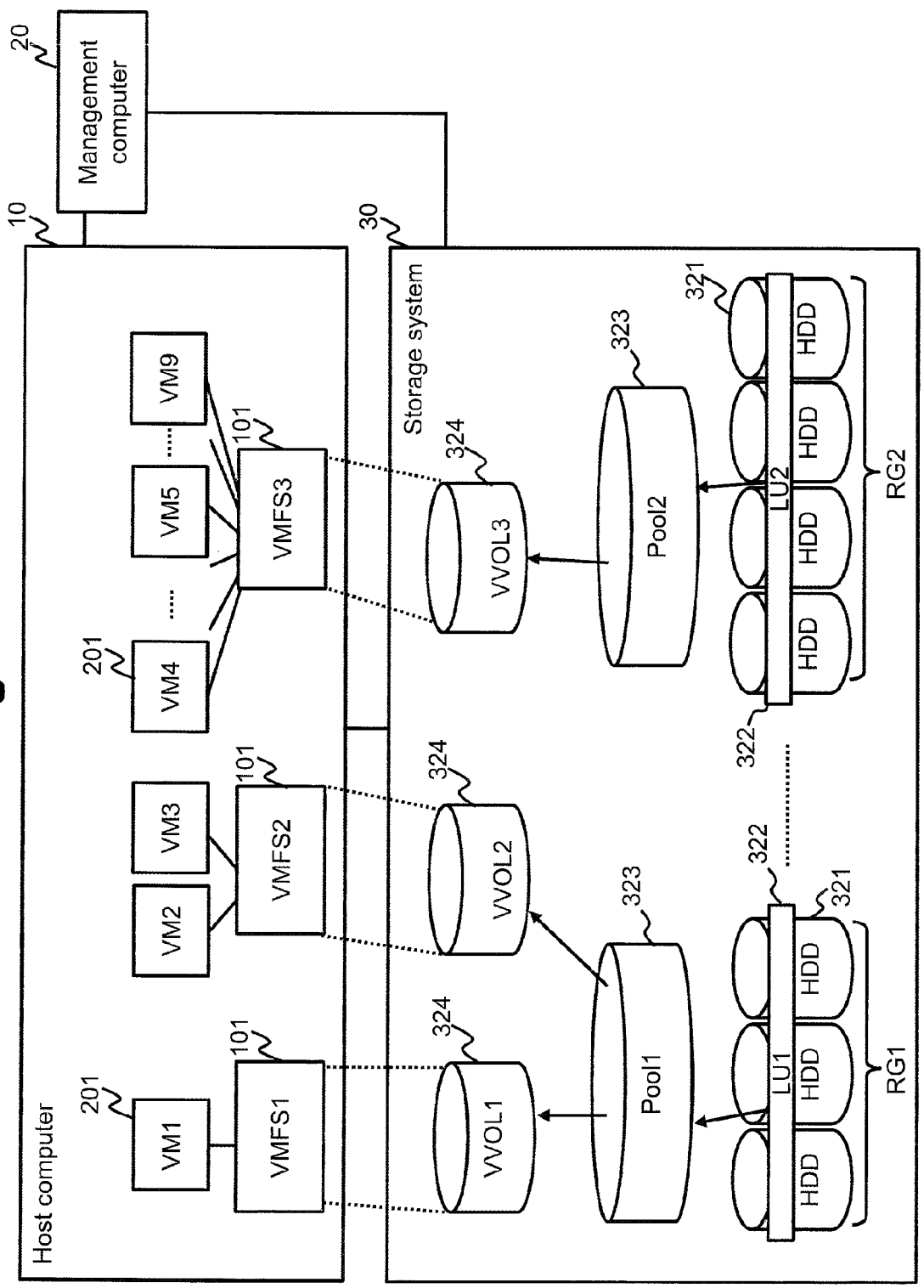
FIG. 2 illustrates an example of logical configuration of a computer system according to the embodiment

FIG. 2 illustrates an example of logical configuration of a computer system according to the embodiment.

The host computer 10 is applied with VMware (registered trademark of VMware, Inc.), and multiple virtual computers (hereinafter, VM (Virtual Machines)) 201 are structured in the host computer 10. In this case, nine VMs 201, i.e., VM-1 to VM-9, are structured. Each of VM-1 to VM-9 uses provided VMFS (file system of VMware) 101. In each VMFS 101, one VVOL 324 is mounted. As described above, "VVOL" is a virtual logical volume applied with thin provisioning (also referred to as dynamic provisioning). The VVOL may be constituted by multiple virtual pages (virtual storage regions).

The VM 201 can access the VVOL 324 mounted to the provided VMFS 101, but cannot access the VVOL 324 mounted to another VMFS 101. More specifically, for example, the VM-1 can access VVOL-1 mounted to the VMFS-1 provided to the VM-1, but cannot access VVOL-2 (3) mounted to VMFS-2 (3) that is not provided to the VM-1.

The storage system 30 has a pool 323. In this case, the storage system 30 includes two pools, i.e., a pool-1 and a pool-2.

The pool 323 may be constituted by one or more pool LUs (Logical Units) 322. The pool LU 322 is an LU constituting the pool 323. The pool LU 322 may be constituted by two or more real pages (physical storage regions). The pool LU 322 may be an LU based on RG, or may be an LU obtained by virtualizing the LU provided by an storage system 30 outside of the storage system 30.

The pool 323 is associated with one or more VVOLs 324. In the VVOL 324, a real page is allocated from a pool associated with the VVOL 324. More specifically, for example, in the VVOL-1, a real page is allocated from the pool-1, but a real page is not allocated from the pool-2.

Among the VVOL-1 to VVOL-3, the VVOL-2 and the VVOL-3 are VVOLs respectively used by multiple VMs 201. For example, the storage system 30 receives, from the VM-2, a write command designating the number of VVOL-2 (for example, LUN (Logical Unit Number)) and an address (LEA (Logical Block Address)). Then, when a real page is not allocated to the virtual page to which the address belongs (write destination virtual page), the storage system 30 allocates any one of the non-allocated real page to the write destination virtual page from the pool-1, and writes data according to the write command to the real page. It should be noted that the address designated here is LBA as described above, but the LBA is a virtual LBA. The virtual LBA is an LBA which belongs to the virtual page (VVOL). In contrast, an LBA that belongs to the real page is referred to as "real LBA".

FIG. 3 illustrates an example of VVOL management table 1300.

The VVOL management table 1300 is a table having information about a VVOL. The VVOL management table 1300 is stored to the control memory 312. For example, for each virtual page, the VVOL management table 1300 associates and manages a VVOL#1301, a virtual page#1302, an allocation flag 1303, a POOL#1304, and a real page#1305.

The VVOL#1301 is an identification number of a VVOL having a virtual page. The virtual page#1302 is an identification number of a virtual page.

The allocation flag 1303 is information indicating whether a real page is allocated to a virtual page or not. When a real page is allocated to a virtual page, the allocation flag 1303 is "allocated", and when a real page is not allocated to the virtual page, the allocation flag 1303 is "unallocated".

The POOL#1304 is identification number of a pool associated with a VVOL having a virtual page. The real page#1305 is an identification number of a real page allocated to a virtual page. A real page#1305 corresponding to a virtual page having no real page allocated thereto is "NULL".

FIG. 4 illustrates an example of page management table 1400.

The page management table 1400 is a table having information about pages. The page management table 1400 is stored to the control memory 312. For example, for each real LBA (LBA that belongs to real page), the page management table 1400 associates and manages a VVOL#1401, a virtual page#1402, a real page#1403, a real LBA#1404, data 1405, and a flag 1406.

The VVOL#1401 is an identification number of a VVOL of allocation destination of a real page to which a real LBA belongs. The virtual page#1402 is an identification number of a virtual page of allocation destination of a real page to which a real LBA belongs. The real page#1403 is an identification number of a real page to which a real LBA belongs.

The real LBA#1404 is a value (number) of real LBA. The data 1405 represent data stored in a region corresponding to the real LBA (region in a real page). The data 1405 "00" indicate that the stored data are zero data (data constituted by zero).

The flag 1406 is information indicating whether a real page to which a real LBA belongs is recoverable to the pool or not. A flag 1406 "1" indicates that a real page can be recovered to the pool. A flag 1406 "0" indicates that a real page cannot be recovered to the pool.

In the present embodiment, when all the data 1405 corresponding to one real page are "00", then it is to be understood that the real page can be recovered to the pool, and moreover, even if all the data 1405 corresponding to one real page are not "00", a real page in which the ratio of the number of data 1405 "00" with respect to the number of data 1405 corresponding to one real page is equal to or more than a predetermined ratio may also recovered to the pool. However, when such real page is recovered to the pool, valid data in the real page (data that are not zero data but are used for VM) are moved to another real page. This processing will be explained later.

FIG. 5 illustrates an example of association management table 1500.

As described above, when a real page storing valid data is recovered to the pool, it is necessary to move the valid data from the real page to another real page. The valid page is moved in units of LBA by the storage controller 31. The association management table 1500 registers association between a move-source real LBA in a move-source real page and a move-destination real LBA of a move-destination real page. The storage controller 31 allocates, to the virtual LBA, the move-destination real LBA (real LBA to which the move-destination region of the move-destination real page belongs) instead of the move-source real LBA (real LBA to which the move-source region of the move-source real page belongs).

The association management table 1500 is stored to the control memory 312. For each virtual page, the association management table 1500 associates and manages a virtual page#1501, a virtual LBA#1502, a move-source 1503, and a move-destination 1504.

The virtual page#1501 is an identification number of a virtual page. The virtual LEA 1502 represents a value (number) of LBA which belongs to the virtual page.

The move-source 1503 includes a real page#1505 and a real LBA#1506. The real page#1505 is identification information of the move-source real page. The real LBA#1506 indicates a move-source real LBA.

The move-destination 1504 includes a real page#1507 and a real LBA#1508. The real page#1507 is identification information of the real page of the move-destination. The real LBA#1508 indicates a move-destination real LBA.

Figure 6:
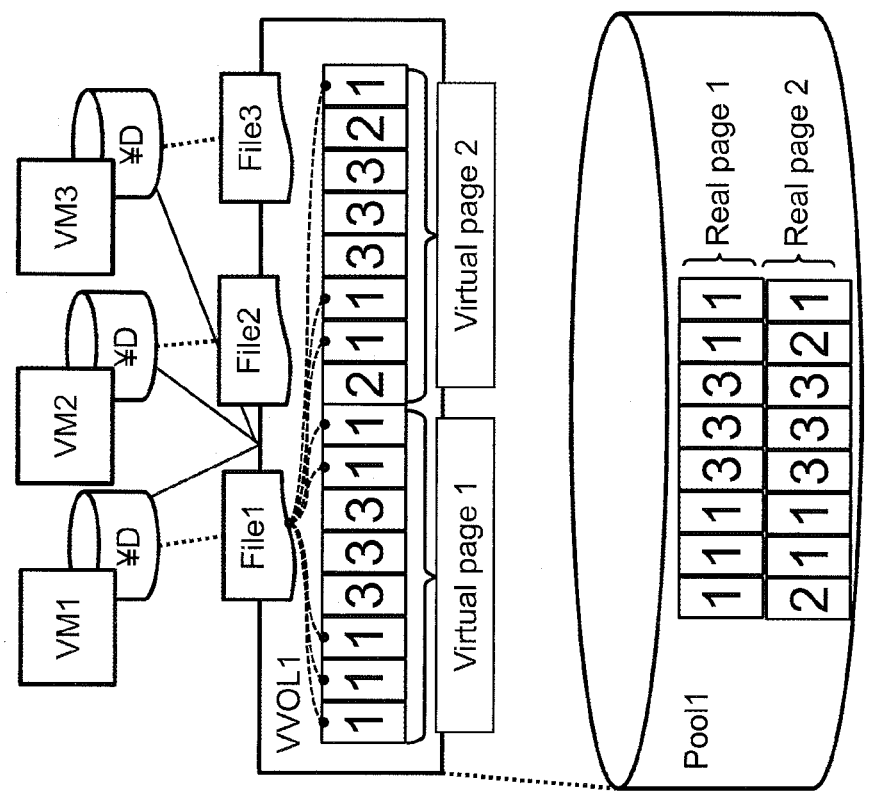
FIG. 6 illustrates an example of situation before real capacity recovery according to the embodiment

Subsequently, the real capacity recovery according to the embodiment will be explained with reference to FIGS. 6 to 9. The real capacity recovery is to recover the real page back to the pool. More specifically, the real capacity recovery is to add the capacity of the real page to the vacant capacity of the pool. In other words, the real capacity recovery is to update the state of the real page of the recovery target to an allocatable state (for example, unallocated state). FIG. 6 illustrates an example of situation before the start of real capacity recovery, but the situation illustrated in FIG. 6 is different from logical configuration illustrated in FIG. 2. In the explanation of FIGS. 6 to 9, the processing typically performed by the storage system 30 is processing typically performed by the storage controller 31 (More specifically, the CPU 311).

As illustrated in FIG. 6, before the real capacity recovery, one VVOL-1 is shared by VMs 1 to 3. Each of the VM-1 to VM-3 can access the VMFS to which the VVOL-1 provided thereto is mounted ("YD" of FIG. 6), store a file to the VVOL-1, update a file in the VVOL-1, and delete a file from the VVOL-1. It should be noted that the file-1 formed by the VM-1 cannot be used by the other VM-2 and VM-3.

The real page-1 and the real page-2 of the pool-1 are allocated to the virtual page-1 and the virtual page-2 of the VVOL-1, respectively. The data (value) constituting the file-1 are stored to the entire region of the real page-1 and the real page-2.

More specifically, for example, when the storage system 30 receives a write command designating a LUN and a virtual LBA of the VVOL-1 from the VM1, a determination is made as to whether a real page is allocated to the virtual page-1 to which the virtual LEA belongs. When the result of determination is true, the storage system 30 writes write target data to a real region of a real page allocated (region to which real LBA corresponding to the designated virtual LBA belongs). On the other hand, when the result of the determination is false, the storage system 30 allocates the unallocated real page-1 to the virtual page-1 and writes write target data to the real region of the real page-1 (region to which real LBA corresponding to the designated virtual LBA belongs). By performing such processing multiple times, the situation as illustrated in FIG. 6 is obtained.

Figure 7:
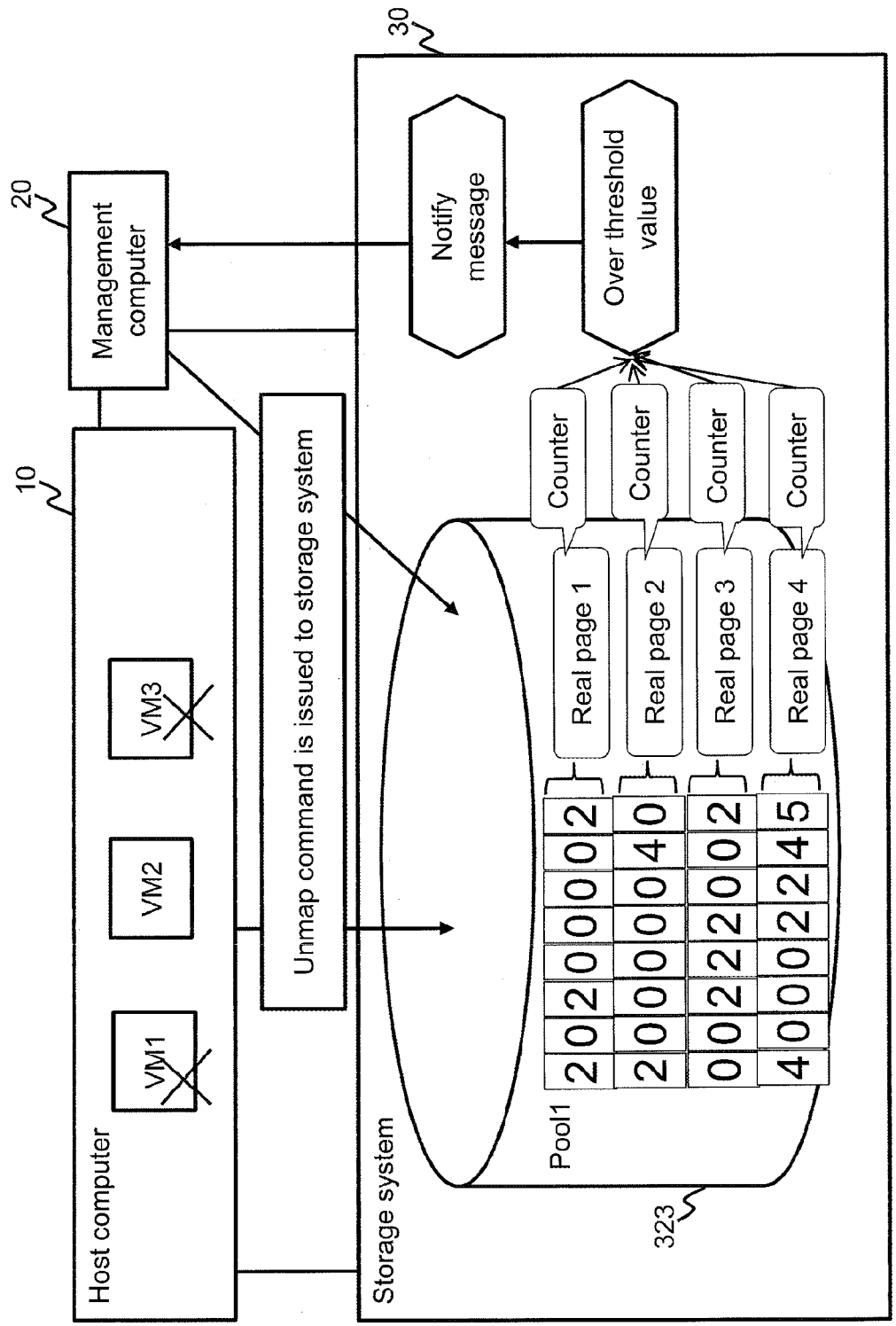
FIG. 7 is a schematic diagram explaining a first part of flow of the real capacity recovery according to the embodiment

As illustrated in FIG. 7, in the present embodiment, a counter is associated for each real page allocated to a virtual page. The counter represents the number of zero regions in the real page associated with the counter. The zero region is a region to which one real LBA belongs, and a region storing zero data.

More specifically, first, every time the storage system 30 receives an Unmap command from the VM or the management computer 20, zero data are written to a region to which the real LBA corresponding to the virtual LBA designated by the Unmap command belongs. As a result, the region becomes the zero region. Then, the storage system 30 updates the counter corresponding to the real page in which the zero region increased.

In this case, the Unmap command is one of SCSI commands, and is a command for commanding to update the data in the virtual page with zero data in LBA units (for example, the virtual LBA unit or the real LBA unit). In the present embodiment, the Unmap command is transmitted from the VM or the management computer 20 to the storage system 30. The data updated with the zero data by the Unmap command are unnecessary data, for example, data that are used by none of the VMs (invalid data). The invalid data are data constituting a file used by the VM-1 and the VM-3 deleted, for example. In this case, the management computer 20 transmits, to the storage system 30, an Unmap command designating the virtual LBA or the real LBA where the data constituting the file used by the VM-1 and the VM-3 deleted are existing. The invalid data may be data determined not to be used by the VM. In this case, the VM transmits, to the storage system 30, an Unmap command designating the virtual LBA of the region storing data that are determined not to be used.

The storage system 30 counts the number of real pages in which the number of zero regions (value indicated by counting) is more than a first threshold value (recoverable real pages), and when the number of recoverable real pages is more than a second threshold value (in a case of "over threshold value" as illustrated in FIG. 7), a recoverable message (a message meaning that real capacity recovery may be performed because the number of recoverable real pages is more than a second threshold value) is notified to the management computer 20.

In this case, the second threshold value may be the number of real pages corresponding to the real capacity required by the user. When the number of recoverable real pages is equal to or less than then second threshold value, the storage system 30 may determine whether the total of the number of recoverable real pages and the number of recovery candidate real pages is more than the second threshold value. When the result of the determination is true, the storage system 30 may transmit an Unmap recommendation message to the management computer 20 or the VM. The Unmap recommendation message is a message meaning that the real capacity recovery can be done by transmitting an Unmap command. The Unmap recommendation message may include the number of recoverable real pages and the number of recovery candidate real pages. The Unmap recommendation message may include the number of recovery candidate real pages and a real LBA (or virtual LBA) of invalid region in that real page. When the Unmap recommendation message is transmitted to the VM, the real LBA (or virtual LBA) included in the message may be a real LBA (or virtual LBA) to which a region storing data constituting a file used by the VM belongs. The recovery candidate real page is a real page in which the number of invalid regions is more than the third threshold value. The invalid region is a region in which the real LBA is the minimum unit, wherein invalid data are stored therein.

After the storage system 30 receives an Unmap command, the storage system 30 may not compare the number of recoverable real pages with the second threshold value. Instead, the storage system 30 may notify the management computer 20 (or the VM) with existence of recoverable real page (real page in which the number of zero regions is more than the first threshold value) and the number of recoverable real pages. If permission is given in advance from the VM or the management computer 20, the storage system 30 may regard a recovery candidate real page as a recoverable real page. For example, when data constituting a file used by a deleted VM-1 are not updated with zero data but the data are determined to be invalid data, then the storage system 30 may regard a region storing the invalid data as a zero region.

The management computer 20 receiving the recoverable message (or user of the management computer 20 (for example administrator)) determines whether to cause the storage system 30 to execute recover of the real capacity (processing for adding the capacity of the recoverable real page to the vacant capacity of the pool). When the result of the determination is true, the management computer 20 transmits, to the storage system 30, a capacity recovery indication which is an indication of recovery of the real capacity. When the capacity recovery indication is transmitted to the storage system 30, the real capacity recovery is performed. The capacity recovery indication may include an identification number of a recoverable real page of recovery target.

Figure 8:
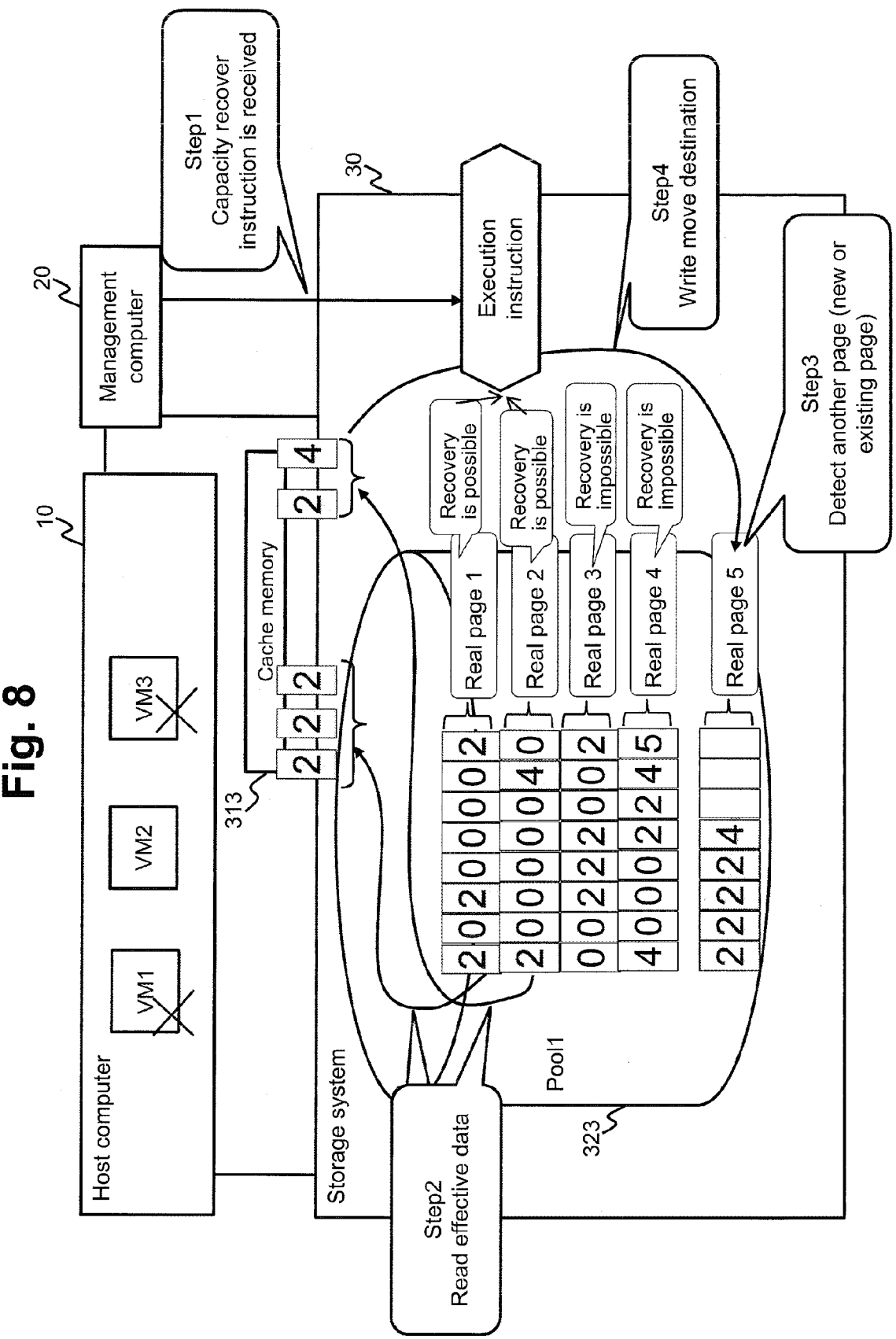
FIG. 8 is a schematic diagram explaining a second part of flow of the real capacity recovery according to the embodiment

More specifically, as illustrated in FIG. 8, the storage system 30 receives the capacity recovery indication from the management computer 20 (Step 1).

Subsequently, the storage system 30 reads valid data from the recoverable real page to the cache memory 313 (Step 2). This processing is not performed when the region of the recoverable real page is all-zero region.

Subsequently, the storage system 30 performs Step 3. More specifically, the storage system 30 detects an unallocated real page (new real page) or an allocated real page (existing real page) (Step 3). In this case, the storage system 30 detects a real page-5 as a new real page. Subsequently, the storage system 30 writes valid data stored in the cache memory 313 to the detected real page-5 (Step 4). In this case, the storage system 30 may write valid data to the new real page-5 (or existing real page) without causing vacant region in such an order from the leading real LBA. Accordingly, the read speed of the storage system 30 is expected to be improved (the same effect as defragmentation can be expected).

Figure 12:
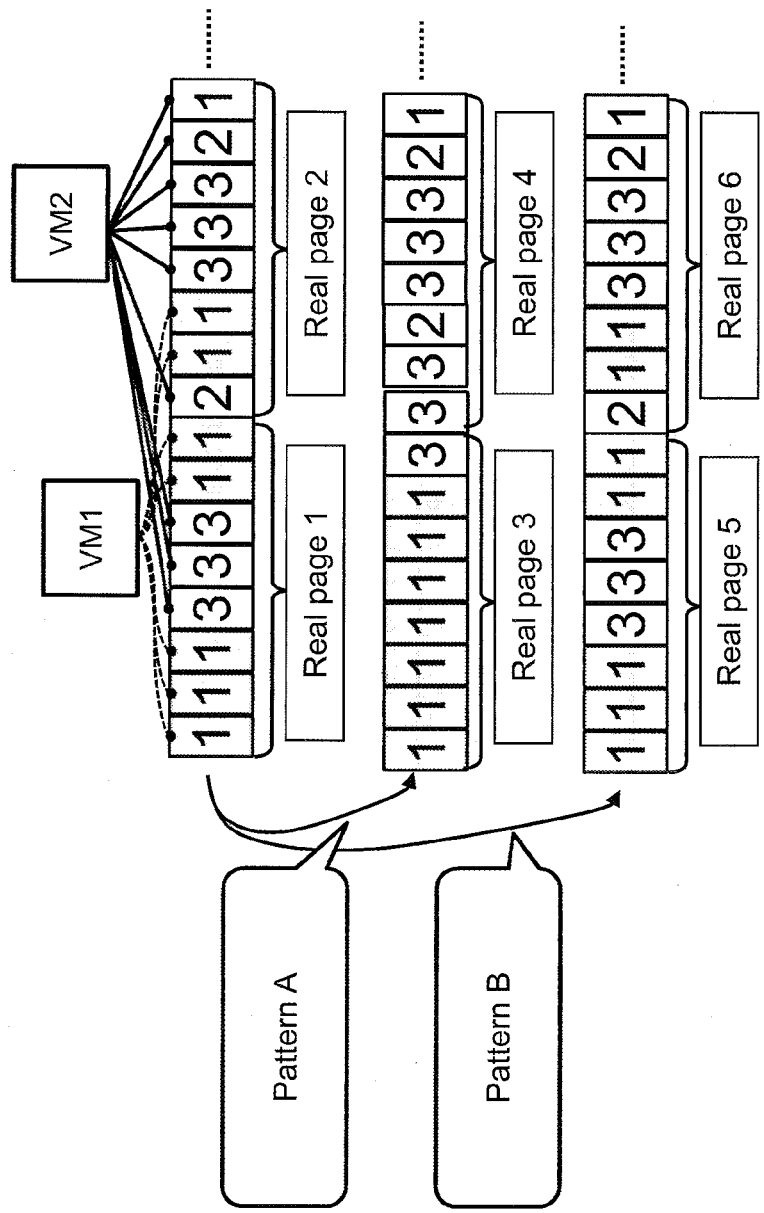
FIG. 12 is a schematic diagram explaining processing for moving valid data to another real page.

For example, FIG. 12 is referred to. In this case, data used by the VM-1 and the VM-2 are stored over the real page-1 and the real page-2.

Like the pattern A, the storage system 30 moves the data used by the VM-1 and the VM-2 from the real page-1 and the real page-2 of the move-source to the real page-5 and the real page-6 of the move-destination, the storage system 30 can move the data used by the VM-1 and the VM-2 from the real page-1 and the real page-2 of the move-source to the real page-5 and the real page-6 of the move-destination, so that the data used by the VM-1 are stored to one continuous region, and the data used by the VM-2 are also stored to one continuous region. When, like the pattern B, for example, the valid data in the real page-1 and the real page-2 are moved to the real page-5 and the real page-6 of the move-destination while the valid data are in the data arrangement as they are, the used data are still stored in a distributed manner for both of the VM-1 and the VM-2.

By moving the data like the pattern A when the number of recoverable real pages is more than the second threshold value, the valid data are expected to be arranged while making as little vacant region as possible in a real page.

Figure 9:
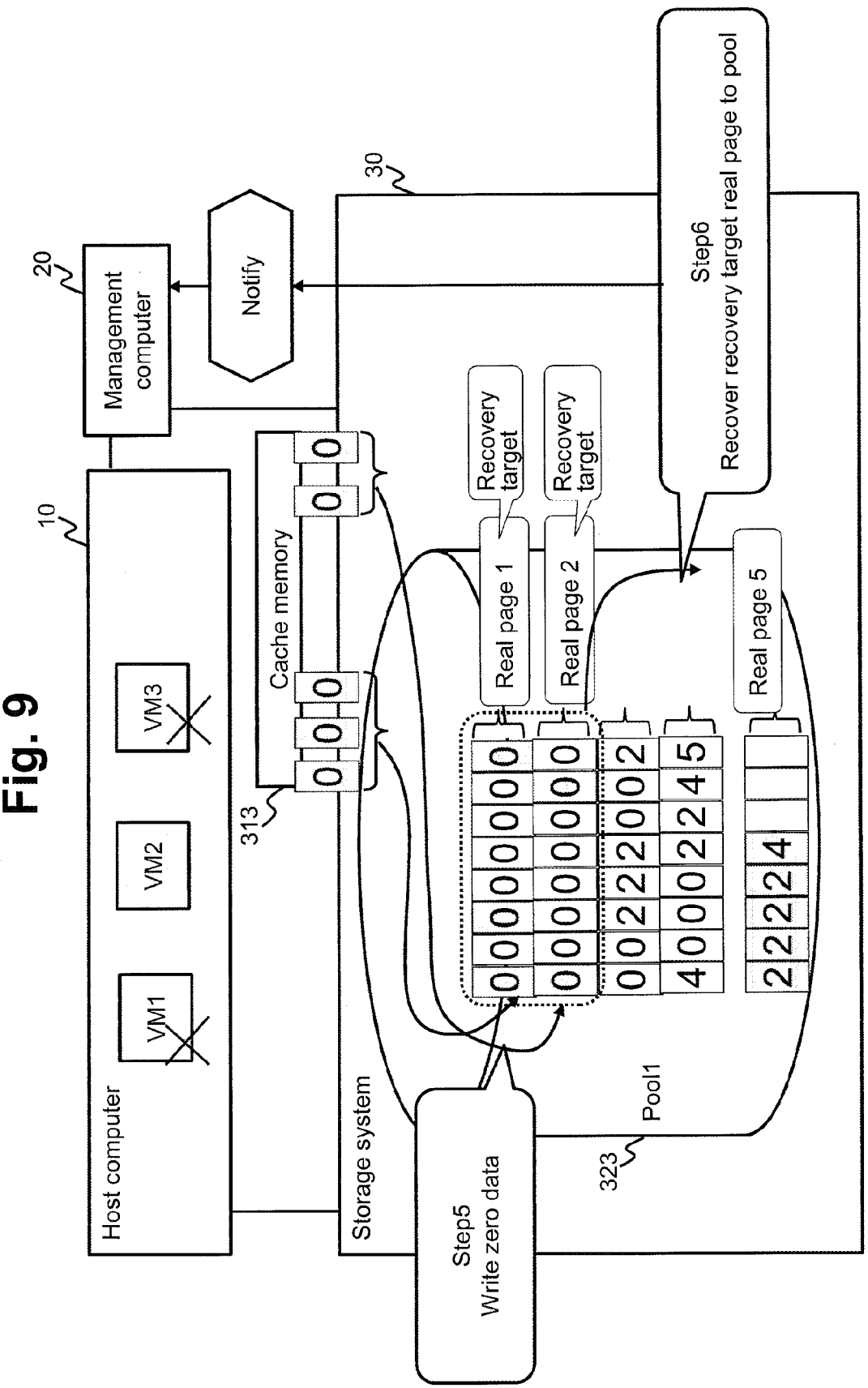
FIG. 9 is a schematic diagram explaining the remaining portion of flow of the real capacity recovery according to the embodiment.

Subsequently, as illustrated in FIG. 9, the storage system 30 updates the valid data in the cache memory. 313 (valid data already written to the region to which the move-destination real LBA belongs) with zero data, and writes the zero data from the cache memory 313 to the regions storing not-yet-updated valid data (regions to which the move-source real LBA belongs) (Step 5). With this processing, all the data of the recoverable real pages (all regions) become zero data (zero regions). The recoverable real page in which the entire region is zero region is the recovery target real page.

The storage system 30 recovers all the recovery target real pages back to the pool (Step 6). More specifically, the storage system 30 adds the capacity of the recovery target real pages to the vacant capacity of the pool.

According to the above explanation, the storage system 30 collects the valid data distributed over multiple real pages to one real page, thus recovering the real pages without deleting the valid data. Accordingly, the efficiency of the capacity of the pool is expected to improve.

The storage system 30 may not transmit a recoverable message to the management computer 20. In this case, when the storage system 30 does not receive a capacity recovery indication from the management computer 20 but detects that the number of recoverable real pages is more than the second threshold value, the storage system 30 may perform processing in Step 2 to Step 6 above.

Figure 10:
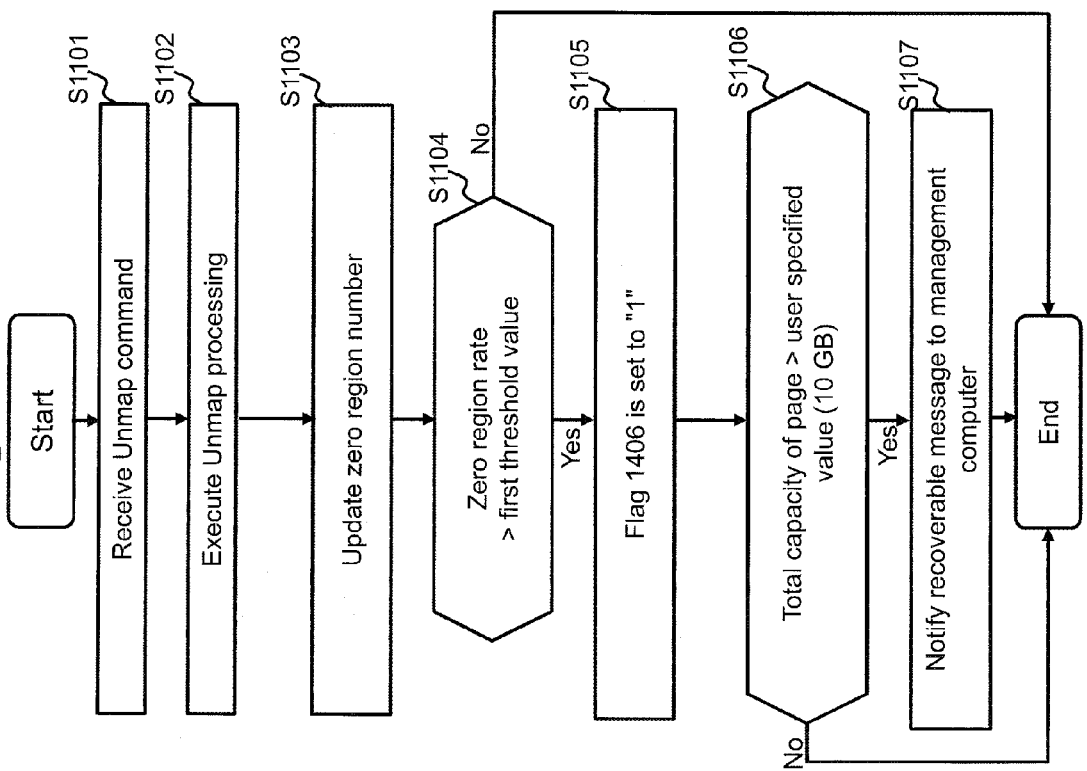
FIG. 10 illustrates an example of flow of Unmap command processing.

FIG. 10 illustrates an example of flow of Unmap command processing.

The storage controller 31 receives an Unmap command from the management computer 20 (or the VM) (S1101).

The storage controller 31 executes Unmap processing according to an Unmap command (S1102). More specifically, the storage controller 31 writes zero data to a region corresponding to a virtual LBA (or real LBA) designated by the Unmap command.

The storage controller 31 updates the counter corresponding to the real page in which the zero regions have increased because of the processing of S1102 (the number of zero regions) (S1103).

With regard to the real page in which the number of zero regions is updated, the storage controller 31 determines whether the ratio of the zero regions (the ratio of the number of zero regions with respect to the number of regions constituting the real page) is more than the first threshold value (for example, 80%) (S1104).

When the determination result in S1104 is false (S1104: No), the storage controller 31 terminates the processing.

When the determination result in S1104 is true (S1104: Yes), the storage controller 31 updates the flag 1406 corresponding to the real page in which the ratio of the zero regions is more than the first threshold value (the flag 1406 of the page management table 1400) with "1" (S1105).

The storage controller 31 determines whether the capacity according to the number of recoverable real pages (the real page corresponding to the flag 1406 "1") is more than the second threshold value (for example, 10 GB) (S1106).

When the determination result in S1106 is false (S1106: No), the storage controller 31 terminates the processing.

When the determination result in S1106 is true (S1106: Yes), the storage controller 31 notifies the recoverable message to the management computer 20 (S1107).

Figure 11:
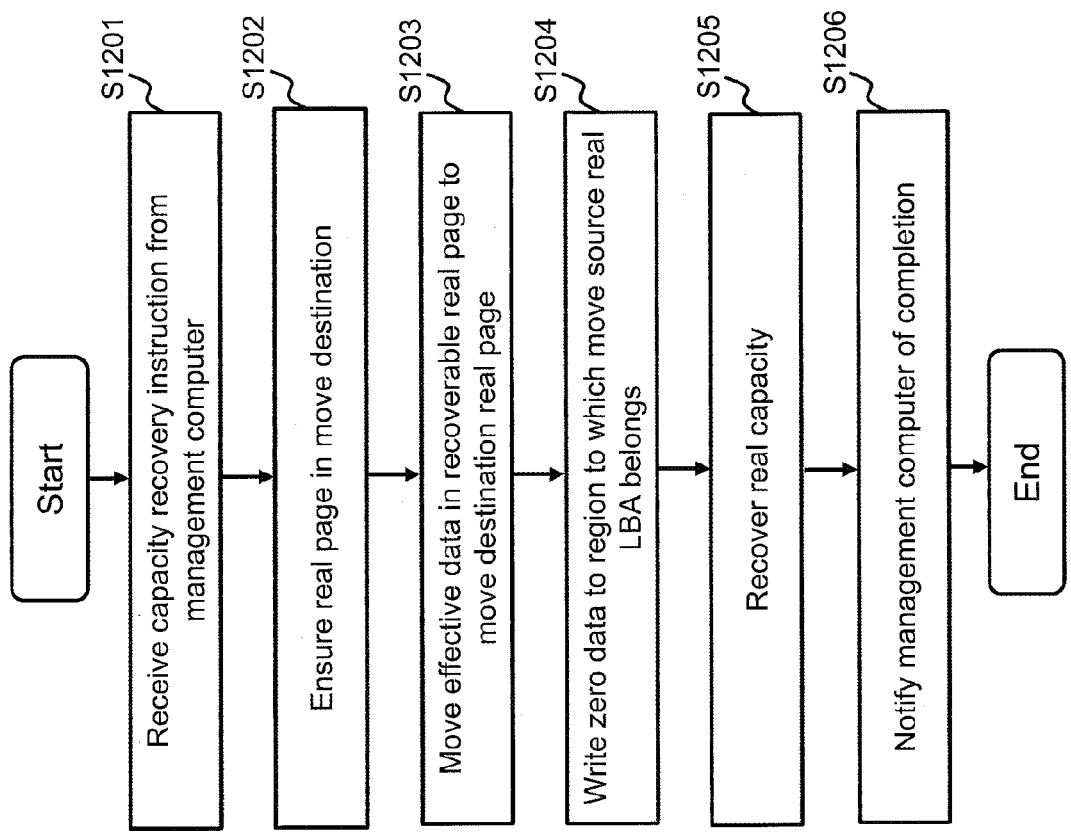
FIG. 11 illustrates an example of flow of capacity recovery indication processing.

FIG. 11 illustrates an example of flow of capacity recovery indication processing.

The storage controller 31 receives the capacity recovery indication from the management computer 20 (S1201).

The storage controller 31 reserves, from the pool, the move-destination real page of the valid data in the recoverable real page (S1202). As described above, the move-destination real page may be an unallocated real page (new real page) or may be an allocated real page (existing real page). When the move-destination real page is an existing real page, the existing real page is expected to be made use of. When the move-destination real page is a new page, the valid data can be arranged from the front of the move-destination real page, and therefore, the valid data can be arranged in a continuously manner as much as possible. The storage controller 31 preferentially reserves the new real page as the move-destination real page over the existing real page.

The storage controller 31 moves the valid data from the region of the move-source real page to which the move-source real LBA belongs to the region of the move-destination real page to which the move-destination real LBA belongs (S1203). After the valid data are moved to the region to which the move-destination real LBA belongs, the storage controller 31 associates, instead of the move-source real LBA, the move-destination real LBA with the virtual LBA corresponding to the move-source real LBA of the valid data ("target virtual LBA" in the explanation of FIG. 11). More specifically, the storage controller 31 stores the identification number of the real page reserved in S1202 as the move-destination real page#1507 corresponding to the target virtual LBA to the association management table 1500, and stores the move-destination real LBA as the real LBA#1508 corresponding to the target virtual LBA to the association management table 1500. Accordingly, when the storage controller 31 receives an I/O command (read command or write command) designating the target virtual LBA, the storage controller 31 refers to the association management table 1500 and performs I/O to/from the region to which the move-destination real LBA corresponding to the target virtual LBA belongs. If the move-destination LBA corresponding to the virtual LBA designated by the I/O command is not recorded in the association management table 1500, then the storage controller 31 processes the I/O command on the basis of the page management table 1400.

The storage controller 31 writes zero data to the region to which the move-source LBA belongs (S1204). With this processing, all the region of the recoverable real page becomes the zero region, and the recoverable real page becomes the recovery target real page.

The storage controller 31 recovers all the recovery target real pages back to the pool (S1205). Then, the storage controller 31 transmits completion notification (notification indicating that the recovery of the real capacity is finished) as a response to, for example, the capacity recovery indication, to the management computer 20 (S1206).

The present invention is not limited to the configuration of the embodiment explained above, and it is to be understood that it can be changed without deviating from the gist thereof.

For example, the present invention is not limited to the case where only one VVOL is used by multiple VMs, and the present invention can be applied even when one VVOL is used by multiple physical computers or multiple application programs (for example, multiple application programs executed by one or more VMs and/or one or more physical computers).

For example, a special write command for writing predetermined data (for example, predetermined pattern data) such as zero data (for example, a command for updating invalid data with predetermined data) is not limited to the Unmap command, and may be other types of commands.

Alternatively, for example, the storage controller 31 may preferentially select, as a move-destination real page, an allocated real page over an unallocated real page, or preferentially select an unallocated real page over an allocated real page, but which of types of real pages is preferentially selected may be determined on the basis of at least one of the load of the storage controller 31 and the situation of the pool. For example, when the load of the storage controller 31 is higher than a predetermined load, the storage controller 31 may preferentially select a move-destination real page over an unallocated real page. For example, when the vacant capacity ratio of the pool (ratio of the number of unallocated real pages with respect to the number of real pages constituting the pool) is less than a predetermined ratio, the storage controller 31 may preferentially select an allocated real page. When the load of the storage controller 31 is higher than a predetermined load, and the vacant capacity ratio of the pool is less than a predetermined ratio, the move-destination real page may be selected on the basis of one of the load of the storage controller 31 and the situation of the pool that has a higher degree of weight.

REFERENCE SIGNS LIST

10 Host computer
20 Management computer
30 Storage system
31 Storage controller
32 Storage unit

The invention claimed is:

1. A storage system comprising:
a virtual volume which is a virtual logical volume, commutatively connected to one or more access sources and includes one or more multiple virtual pages;
a pool that includes one or more real pages, wherein each real page includes one or more real regions; and
a storage controller configured to:
receive a write command that contains target data and designates a write destination virtual address for one or more of the access sources,
allocate an unallocated real page as an allocated real page to a write destination virtual page located at the write destination virtual address, when the real page is not allocated to the write destination virtual page located at the write destination virtual address, and write the target data to a real region in the allocated real page,
receive a special write command, that includes a command for writing predetermined data and designates a write destination address,
write the predetermined data, in response to the special write command, to a real region corresponding to the write destination address,
perform data move processing, when a number of recoverable real pages is more than a second threshold value, for moving all valid data stored in two or more move-source real pages respectively allocated to two or more virtual pages, to move-destination real pages the number of which is less than a number of move-source real pages in units of real regions, each piece of valid data being data that can be used by any one of the one or more access sources,
write the predetermined data to all move-source real regions in each of move-source real pages, so that each of the move-source real pages is set as a recovery target real page which is a real page storing only the predetermined data;
perform a real capacity recovery for making each recovery target real page into an unallocated state,
transmit a first notification, when the number of recoverable pages is equal to or less than the second threshold value but a summation of the number of recoverable real pages and a number of recovery candidate real pages is more than the second threshold value,
wherein the move-source real page is a recoverable real page which is a real page in which the number of real regions storing the predetermined data is more than a first threshold value, and
wherein the recovery candidate real pages are real pages in which the number of real regions storing invalid data not referred to by the access source is more than a third threshold value.

2. The storage system according to claim 1, wherein when the number of recoverable pages is equal to or less than the second threshold value but a summation of the number of recoverable real pages and the number of recovery candidate real pages is more than the second threshold value, the storage controller is configured to perform the data move processing by regarding the recovery candidate real page as a recoverable real page.

3. The storage system according to claim 1, wherein the second threshold value is a value set with an input device used by a user.

4. The storage system according to claim 1, wherein when the number of recoverable real pages is more than the second threshold value, the storage controller is further configured to:
　transmit a second notification when the number of recoverable real pages is more than the second threshold value, and
　perform the data move processing, upon receiving a capacity recovery indication which is an indication of the real capacity recovery.

5. The storage system according to claim 4, wherein a management computer managing the storage system and the one or more access sources is coupled to the storage controller, and
　a transmission destination of the second notification is the management computer.

6. The storage system according to claim 1, wherein the storage controller is configured to store, in the data move processing, move target valid data to the move-destination real page, so that multiple valid data are stored to a real region in which the move-destination real pages are continuous.

7. The storage system according to claim 1, wherein the storage controller is configured to preferentially select, as the move-destination real page, an allocated real page over an unallocated real page.

8. The storage system according to claim 1, wherein the storage controller is configured to preferentially select, as the move-destination real page, an unallocated real page over an allocated real page.

9. A storage control method for a storage system comprising:
　receiving a write command that includes target data and designates a write destination virtual address from one or more access sources;
　allocating an unallocated real page as an allocated real page to a write destination virtual page located at the write destination virtual address when the real page is not allocated to a write destination virtual page, and writing the target data to a real region in the allocated real page;
　receiving a special write command that includes a command for writing predetermined data and designates a write destination address;
　writing the predetermined data, in response to the special write command, to a real region corresponding to the write destination address;
　performing data move processing, when a number of recoverable real pages is more than a second threshold value, for moving all multiple valid data stored in two or more move-source real pages respectively allocated to two or more virtual pages, to move-destination real pages the number of which is less than a number of move-source real pages in units of real regions, each piece of valid data being data that can be used by any one of the one or more access sources;
　writing the predetermined data to all move-source real regions in each of move-source real pages, so that each of the move-source real pages is set as a recovery target real page which is a real page storing only the predetermined data; and
　performing a real capacity recovery for making each recovery target real page into an unallocated state,
　transmitting a first notification, when the number of recoverable pages is equal to or less than the second threshold value but a summation of the number of recoverable real pages and a number of recovery candidate real pages is more than the second threshold value,
　wherein the move-source real page is a recoverable real page which is a real page in which the number of real regions storing the predetermined data is more than a first threshold value, and
　wherein the recovery candidate real pages are real pages in which the number of real regions storing invalid data not referred to by the access source is more than a third threshold value.

10. A computer system comprising:
　a storage system; and
　a management computer configured to manage the storage system,
　wherein the storage system includes a virtual volume which is a virtual logical volume, is provided to one or more access sources and includes one or more virtual pages, and a pool which is a set of one or more real pages each including one or more real regions,
　the storage system is configured to:
　receive a write command including target data and designating a write destination virtual address from one or more access sources,
　allocate an unallocated real page as an allocated real page to a write destination virtual page located at the write destination virtual address, when the real page is not allocated to the write destination virtual page located at the write destination virtual address, and write the target data to a real region in the allocated real page,
　receive a special write command that includes a command for writing predetermined data and designates a write destination address,
　write the predetermined data, in response to the special write command, to a real region corresponding to the write destination address,
　receive a capacity recovery indication from the management computer,
　perform data move processing, when a number of recoverable real pages is more than a second threshold value, for moving all valid data stored in two or more move-source real pages respectively allocated to two or more virtual pages, to move-destination real pages the number of which is less than a number of move-source real pages in units of real regions, each piece of valid data being data that can be used by any one of the one or more access sources,
　transmit a first notification, when the number of recoverable pages is equal to or less than the second threshold value but a summation of the number of recoverable real pages and a number of recovery candidate real pages is more than the second threshold value,
　wherein the move-source real page is a recoverable real page which is a real page in which the number of real regions storing the predetermined data is more than a first threshold value, wherein the recovery candidate real page is a real page in which the number of real regions storing invalid data not referred to by the access source is more than a third threshold value, write the predetermined data to all move-source real regions in each of move-source real pages, so that each of the move-source real pages is set as a recovery target real page which is a real page storing only the predetermined data;

perform a real capacity recovery for making each recovery target real page into an unallocated state, the management computer is configured to transmit, to the storage system, the capacity recovery indication which is an indication of real capacity recovery, and wherein the move-source real page is a recoverable real page which is a real page in which the number of real regions storing the predetermined data is more than a first threshold value, and wherein the recovery candidate real pages are real pages in which the number of real regions storing invalid data not referred to by the access source is more than a third threshold value.

* * * * *